July 21, 1953 A. C. SCHROEDER 2,646,463

APPARATUS FOR REPRODUCING IMAGES IN COLOR

Filed July 18, 1951

INVENTOR
ALFRED C. SCHROEDER
BY [signature]
ATTORNEY

Patented July 21, 1953 2,646,463

UNITED STATES PATENT OFFICE 2,646,463

APPARATUS FOR REPRODUCING IMAGES IN COLOR

Alfred C. Schroeder, Southampton, Pa., assignor to Radio Corporation of America, a corporation of Delaware Application July 18, 1951, Serial No. 237,362

2 Claims. (Cl. 178—5.4)

This invention relates to apparatus for reproducing images in color in response to video signals representing each of a plurality of component colors and derived by a scanning process.

In the prior art each of the component color signals of this type have been applied so as to control the intensity variations of a separate kinescope. Colored images can also be reproduced by a single kinescope. Generally such a kinescope has phosphor distributed over the face of the tube. The phosphor is adapted to reproduce the different component colors. Means are provided for exciting each of the differently colored phosphors into fluorescence of an intensity corresponding to the variations of the corresponding color signal. In some color image reproducing devices a separate electron beam excites each different color of phosphor and in other image reproducing devices phosphor excitation is done in sequence by a single beam.

The maximum brightness of most scenes exceeds the maximum brightness provided by a kinescope, and to this extent the images formed by the kinescope are not faithful reproductions. Therefore, the images formed by kinescopes can be improved if the maximum light provided by the kinescope is increased without producing other harmful effects in the image.

It has previously been suggested in my U. S. application Serial No. 234,015, filed June 28, 1951, that increased brightness could be attained by providing a brightness reproducing means in addition to the different color reproducers. The smallest color signal is applied to the brightness reproducer and the difference between a given color signal and the smallest color signal is applied to the corresponding color reproducer. In any white area, where all the color signals are of the same amplitude, only the brightness reproducer receives any signal, as the difference between one color signal and any other is zero. If the white area is sufficiently white, the brightness reproducer may be overloaded, or the signals may have to be lowered in amplitude so as to prevent overloading.

It is accordingly the object of this invention to produce images in color having a greater maximum brightness.

Briefly, this objective can be attained by applying equal signals to each of the color reproducers for all values of brightness signal that would overload the brightness reproducer. The combined light output of the color reproducers is white and this white light is added to the white light produced by the brightness reproducer. As pointed out in the application noted above, the brightness reproducer may emit yellow rather than white light. In this case the blue signals are applied directly to the blue reproducer as is normally done.

The details of this invention may be better understood from a consideration of the drawings in which.

Figures 1, 1A:
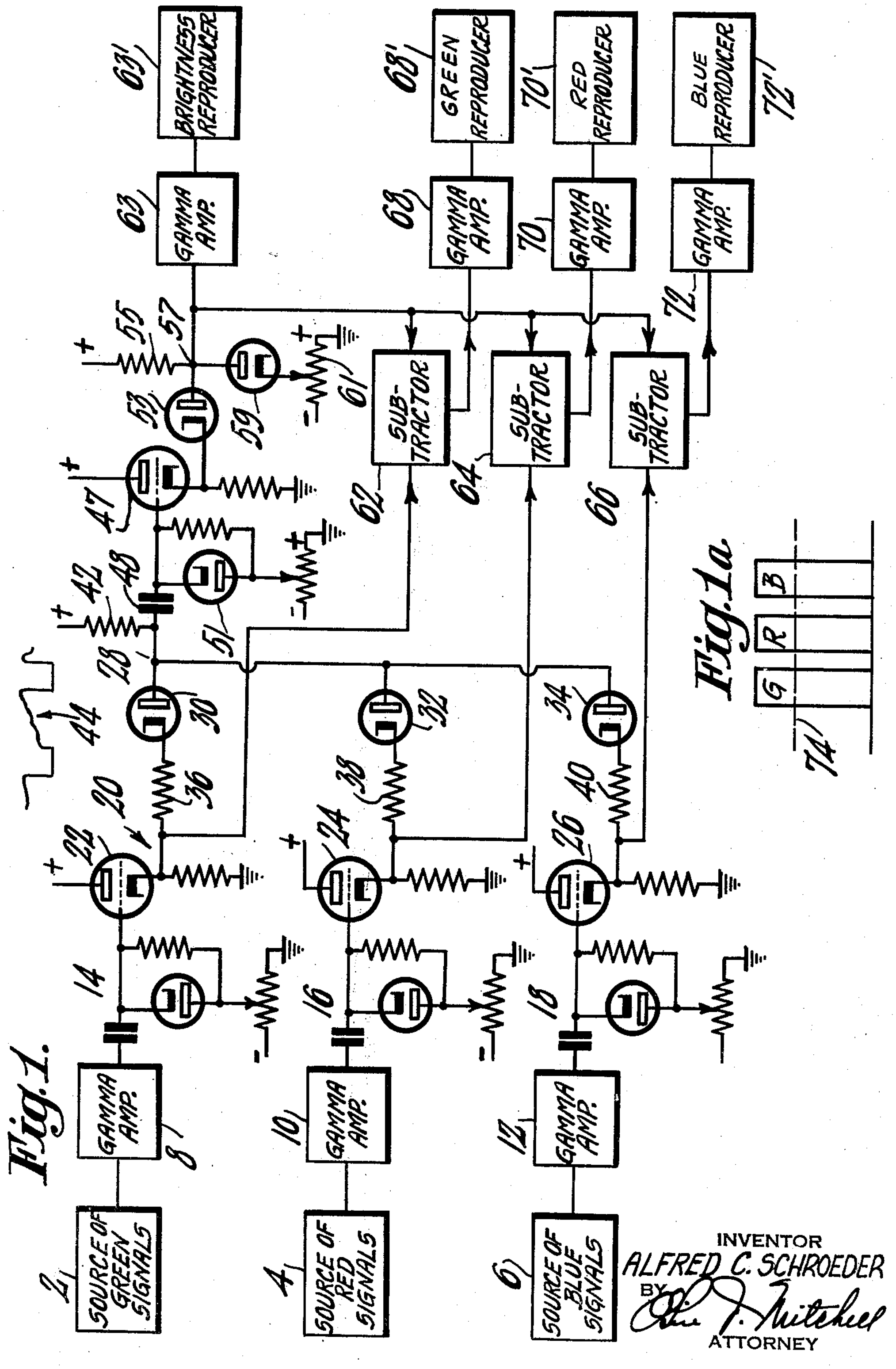
Figure 1 illustrates one form this invention may assume.
Figure 1A is a graph used in explaining the operation of the apparatus of Figure 1.

Turning now to Figure 1 we find that video signals representing the intensity variations of green, as a scene is scanned, are provided by a source 2. The corresponding red and blue video signals are provided by the sources 4 and 6 respectively. Because the present invention involves subtracting one color signal from another, these signals should be linear. Generally, the color signals available in television systems and the like are not linear and accordingly, the green, red, and blue video signals are passed through gamma amplifiers 8, 10, and 12 respectively.

If the video signals appearing at the output of the gamma amplifiers 8, 10, and 12 do not have proper D. C. levels, level setters such as 14, 16, and 18 may be inserted.

The output signals of the level setters 14, 16 and 18 are applied to a means 20 for selecting the color signal of the lowest amplitude. In the particular form of selecting means shown, the green video signals are applied to a cathode follower 22, the red video signals to a cathode follower 24, and the blue video signals to a cathode follower 26. The cathodes of the cathode followers 22, 24, and 26 are coupled to a common junction 28 by similarly polarized diodes 30, 32 and 34 respectively. Resistors 36, 38, and 40 are respectively connected in series with the diodes 30, 32, and 34. The junction 28 is connected to a source of fixed potential via a resistor 42 of relatively high ohmic value. The polarity of the diodes depends on the polarity of the signals supplied by the cathode follower to the diode. If the signals appearing at the cathodes of the cathode followers 22, 24, and 26 are of a polarity such that the signal increases in proportion to the brightness, the cathodes of the diodes are connected to the cathodes of the corresponding cathode followers.

The means 20 for selecting the color signal having the lowest amplitude operates as follows. With no color signals present, the diodes all conduct the same amount. This is the condition that prevails during blanking when all the signals go to zero or black level as indicated by the graph 44. As the intensity of a color signal increases, the potential applied to the cathode of the corresponding diode becomes more positive. The diode to which the lowest color signal is applied conducts the most and the potential of all the diode plates drops to a value just above that of the lowest color signal. This latter value is less than the other color signals and therefore the other color signals cannot pass to the junction 28. If all the color signals are equal, as in a white portion of an image, all the diodes conduct equally. If only a single color signal is present, it cannot get through to the junction 28 because the other signals have zero value.

The signal appearing at the junction 28 is coupled to a cathode follower 47 via a blocking condenser 48, and its D. C. level is reset at the grid of the cathode follower 47 by a clamping circuit 51. The cathode of the cathode follower 47 is connected to a source of fixed potential via a diode 53 and a resistor 55. When the signal at the junction 28 is zero, the diode 53 may conduct. As the signal increases, the potential of the cathode of the cathode follower 47 increases, and the potential at the junction 57 of the diode 53 and the resistor 55 increases. The plate of a diode 59 is connected to the junction 57 and its cathode to a potentiometer 61. When the signal at the junction 57 is more positive than the potential of the cathode of the diode 59, the diode 59 conducts, thus preventing the signal at the junction 57 from increasing further. The signal appearing at the junction 57 is applied to a brightness reproducer 63′ via a gamma amplifier 63 and also to each of a plurality of subtractors 62, 64, and 66. The maximum value of the signal as determined by the potentiometer 61 is such as to cause the brightness reproducer 63′ to emit a desirable maximum amount of light. The gamma amplifier 63 normally compensates for the action of the gamma amplifiers 8, 10, and 12. Its purpose is to secure the proper gamma for signals applied to the brightness reproducer.

The green video signal appearing at the output of the cathode follower 22 is subtracted in the subtractor 62 from the limited signal appearing at the junction 57, and the color difference signal thus derived is applied to a green reproducer 68′ via a gamma amplifier 68. The red and blue video signals are applied to the subtractors 64 and 66 respectively so as to derive color difference signals for application to red and blue reproducers 70′ and 72′ via gamma amplifiers 70, and 72.

The operation of the apparatus of Fig. 1 will now be explained. Assume that the scene has a very bright white area. All the green, red, and blue signals are of the same amplitude and each exceeds the maximum desirable signal level indicated by the dashed line 74 of Figure 1A. The potentiometer 61 can be set at the level of the dashed line 74 so that the maximum brightness signal at the junction 57 has the same value. The brightness reproducer therefore produces its maximum desirable amount of light. This limited brightness signal is subtracted from the equal green, red, and blue signals in the subtractors 62, 64, and 66 so as to yield signals of equal amplitudes. These signals, when applied to the color reproducers produce white light that is added to the white light produced by the brightness reproducer 63′. Hence the maximum brightness available is increased. If the limiter were not employed, no signals would be applied to the color reproducers, thus making the brightness producer assume the full burden.

If the brightness reproducer emits yellow light, the blue signals are bypassed around the selecting means 20 and coupled directly to the blue reproducer. Thus the blue signals do not control the amplitude of the signals applied to the brightness reproducer. As is well known, yellow light is comprised of red and green. Thus the smaller of the red and green signals is supplied to the brightness reproducer, and the difference between the two signals is applied to a reproducer adapted to produce light corresponding to the larger signal.

If both the red and green signals are equal and exceed the level of the dashed line 74, the yellow brightness reproducer emits light of an intensity corresponding to the level 74, and the green and red reproducers produce more yellow light.

What is claimed is:

1. Apparatus for reproducing images in color comprising in combination a plurality of sources of color signals, means for selecting the smallest color signal coupled to said sources, a plurality of subtractors, said subtractors being coupled to said sources, and a limiter coupled between the output of said selecting means and each of said subtractors in such manner that the smallest of said color signals is subtracted from each of the color signals, a brightness image reproducer coupled so as to have the intensity of its light controlled by the output of said limiter, and a reproducer of differently colored images coupled to the output of each of said subtratcors.

2. Apparatus for reproducing images in color in response to a plurality of color signals comprising in combination means for selecting the smallest color signal, a reproducer of brightness images, a limiter coupled between said selecting means and said reproducer, a plurality of subtractors, each of said subtractors being coupled so as to subtract the output of said limiter from each of said color signals, and a reproducer of a different color coupled to the output of each one of said subtractors.

ALFRED C. SCHROEDER.

References Cited in the file of this patent

UNITED STATES PATENTS

| Number | Name | Date |
|---|---|---|
| 2,492,926 | Valensi | Dec. 27, 1949 |